UNITED STATES PATENT OFFICE.

JOSHUA H. ROBERTSON, OF SAN FRANCISCO, CALIFORNIA, ASSIGNOR TO CHARLES W. RANDALL, OF SAME PLACE.

DYNAMITE.

SPECIFICATION forming part of Letters Patent No. 307,988, dated November 11, 1884.

Application filed February 13, 1884. (No specimens.)

*To all whom it may concern:*

Be it known that I, JOSHUA H. ROBERTSON, of the city and county of San Francisco, and State of California, have invented an Improvement in Explosive Compounds and in the Manufacture of the Same; and I hereby declare the following to be a full, clear, and exact description thereof.

The primary object of my invention is to produce the most perfect, intimate, and tenacious union between the particles of nitro-glycerine and the particles of the substance or substances with which it may be associated in the manufacture of explosive compounds, in order that the resulting compound may, under all circumstances and conditions, retain intact its full complement of nitro-glycerine.

Many of the explosive compounds heretofore in use, especially those composed of a mixture of nitro-glycerine with infusorial or silicious earths, require a large percentage of nitro-glycerine to insure their detonation, and an important result of my process is to produce an explosive compound in which a comparatively small proportion of nitro-glycerine can be readily exploded.

It is a well-known fact that many substances susceptible of crystallization unite in certain definite proportions with water to form crystals, and that the proportion in which this water of crystallization unites with any given substance is unchangeable and constant. A definite affinity or attraction appears to exist between the atoms of water and the atoms of the crystallizable substance, which, if not absolutely chemical in its nature, approaches nearly thereto.

I have discovered that if the water of crystallization be thoroughly expelled and eliminated from a crystalline salt of an alkali earth or metal, and the salt thus deprived of its water of crystallization be at once brought into contact with nitro-glycerine, an immediate and intimate combination of the anhydrous salt and the nitro-glycerine takes place, and a new compound is formed which is permanent and homogeneous in character, and which possesses certain distinct and desirable properties not possessed in similar degree by any nitro-glycerine compound heretofore in use. The nitro-glycerine replaces the water of crytallization, and the salt, which in becoming anhydrous became at the same time amorphous, after its mixture with nitro-glycerine, becomes granular. The explosive compound thus formed is very much less liable to accidental explosion than that formed in the old way. It is constant and uniform in its composition, and by reason of this homogeneity it is much safer. Further, its susceptibility to explosion is the same in all its parts.

Nitro-glycerine compounds formed in the mode used before my invention, when exposed to certain slight increase of heat, exude or give up a portion of their nitro-glycerine, and the paper or cases containing them become saturated with pure nitro-glycerine, and are thus exposed to the danger of premature and accidental explosions. As is well known, many fatal explosions have occurred from this cause.

It is a material point in my invention that the salt should be deprived of its water of crystallization, and while thus freed from this water should be brought into contact with the nitro-glycerine. The salt may be thus freed in any of the well-known ways, as by a reverberatory or other furnace, a degree of heat being applied sufficient for the purpose. The best results are attained by uniting the anhydrous substance employed immediately, or very soon after the former has been deprived of its water of crystallization.

To manufacture an explosive compound according to my invention, I first thoroughly and completely expel the water of crystallization from a sufficient quantity of the material selected, and the anhydrous product is next reduced to an impalpable powder. I then place sixty-five parts of the material thus prepared in a wooden tank or other suitable receptacle, and gradually add thereto thirty-five parts of nitro-glycerine, mixing the ingredients thoroughly by stirring.

I do not wish to limit myself to the proportions given, as the relative proportions of the ingredients may be increased or diminished in accordance with the desired strength of the explosive.

I stir the mixture by a wooden rake or other suitable utensil until the union between the anhydrous material and nitro-glycerine is perfect, and a compound of a granular texture is produced. The compound is then ready to be placed into cartridges for use. Care should be taken not to add sufficient nitro-glycerine to reduce the compound to a soft or pasty consistence, and a dry granular substance is produced.

I am aware that a solid explosive has been devised consisting of calcined gypsum and nitro-glycerine with coated grains, or formed in cakes or cylinders with the ingredients in nearly equal proportions, as set forth in the patent of Shaffner, No. 93,752, of August 17, 1869, and I do not claim this.

In my invention the nitro-glycerine is simply substituted for the water of crystallization.

I claim—

1. The process of manufacturing an explosive compound of nitro-glycerine and a crystalline salt, consisting in first expelling the water of crystallization from the salt, then reducing the salt thus freed to a powder and mixing therewith nitro-glycerine, whereby the nitro-glycerine is caused to take the place of the water of crystallization and a granular compound produced, substantially as described.

2. An explosive compound consisting of an anhydrous salt combined with nitro-glycerine, said nitro-glycerine taking the place of the water of crystallization and forming grains, all substantially as described.

In witness whereof I have hereunto set my hand.

JOSHUA H. ROBERTSON.

Witnesses:
S. H. NOURSE,
H. C. LEE.